United States Patent
Lim

(10) Patent No.: US 11,182,099 B2
(45) Date of Patent: Nov. 23, 2021

(54) MEMORY SYSTEM AND OPERATING METHOD THEREOF

(71) Applicant: SK hynix Inc., Icheon (KR)

(72) Inventor: Min Soo Lim, Hwaseong (KR)

(73) Assignee: SK hynix Inc., Icheon (KR)

( * ) Notice: Subject to any disclaimer, the term of this patent is extended or adjusted under 35 U.S.C. 154(b) by 51 days.

(21) Appl. No.: 16/749,898

(22) Filed: Jan. 22, 2020

(65) Prior Publication Data
US 2021/0011651 A1    Jan. 14, 2021

(30) Foreign Application Priority Data

Jul. 9, 2019 (KR) .................. 10-2019-0082554

(51) Int. Cl.
*G06F 3/06* (2006.01)
*G06F 11/10* (2006.01)

(52) U.S. Cl.
CPC ............ *G06F 3/0652* (2013.01); *G06F 3/068* (2013.01); *G06F 3/0616* (2013.01); *G06F 3/0653* (2013.01); *G06F 11/1076* (2013.01)

(58) Field of Classification Search
CPC .... G06F 11/1076; G06F 3/067; G06F 3/0653; G06F 3/0616; G06F 3/068; G06F 3/0688; G06F 3/0652; G06F 11/10; G06F 3/06
See application file for complete search history.

(56) References Cited

U.S. PATENT DOCUMENTS

| | | | |
|---|---|---|---|
| 8,255,772 B1 | 8/2012 | Foley | |
| 8,364,883 B2* | 1/2013 | Bennett | G06F 12/0246 711/103 |
| 2009/0070648 A1* | 3/2009 | Allison | G06F 11/106 714/746 |
| 2009/0164842 A1 | 6/2009 | Browne et al. | |
| 2014/0229766 A1* | 8/2014 | Campbell | G06F 11/106 714/15 |
| 2014/0317460 A1* | 10/2014 | Kleveland | G11C 29/44 714/710 |
| 2019/0188589 A1* | 6/2019 | Ponnuru | G06F 11/1048 |
| 2020/0387323 A1* | 12/2020 | Boehm | G06F 3/0616 |

OTHER PUBLICATIONS

J. L. Nuns, J. C. Cunha and M. Zenha-Rela, "Using Failure Prediction to Improve FPGA Scrubbing," 2016 Seventh Latin-American Symposium on Dependable Computing (LADC), 2016, pp. 135-138.*

(Continued)

*Primary Examiner* — Pierre Miche Bataille

(57) ABSTRACT

A memory system includes a memory group including a plurality of memory devices having two or more different types; and a controller configured to control data input and output for the memory group, wherein the controller includes a scrubbing controller configured to collect health information to which a deterioration degree for each of the plurality of memory devices is reflected and determine a scrubbing interval for each of the plurality of memory devices based on the health information, the scrubbing interval being reduced in proportion to the deterioration degree.

8 Claims, 5 Drawing Sheets

(56) References Cited

OTHER PUBLICATIONS

C. H. A. Costa, Y. Park, B. S. Rosenburg, C. Cher and K. D. Ryu, "A System Software Approach to Proactive Memory-Error Avoidance," SC '14: Proceedings of the International Conference for High Performance Computing, Networking, Storage and Analysis, 2014, pp. 707-718.*

T. Jiang, p. Huang and K. Zhou, "Scrub Unleveling: Achieving High Data Reliability at Low Scrubbing Cost," 2019 Design, Automation & Test in Europe Conference & Exhibition (DATE), 2019, pp. 1403-1408.*

M. Awasthi, M. Shevgoor, K. Sudan, B. Rajendran, R. Balasubramonian and V. Srinivasan, "Efficient scrub mechanisms for error-prone emerging memories," IEEE International Symposium on High-Performance Comp Architecture, 2012, pp. 1-12.*

E. Hwang, S. Jeon, R. Negi, B. V. K. V. Kumar and M. K. Cheng, "Scrubbing with partial side information for radiation-tolerant memory," 2010 IEEE Globecom Workshops, 2010, pp. 1941-1945.*

H. Wang, K. Zhao, M. Lv, X. Zhang, H. Sun and T. Zhang, "Improving 3D DRAM Fault Tolerance Through Weak Cell Aware Error Correction," in IEEE Transactions on Computers, vol. 66, No. 5, pp. 820-833, May 1, 2017.*

* cited by examiner

MEMORY SYSTEM AND OPERATING METHOD THEREOF

CROSS-REFERENCES TO RELATED APPLICATION

The present application claims priority under 35 U.S.C. § 119(a) to Korean Patent Application Number 10-2019-0082554, filed on Jul. 9, 2019, in the Korean Intellectual Property Office, which is incorporated herein by reference in its entirety.

BACKGROUND

1. Technical Field

Various embodiments generally relate to a memory system, and more particularly, to a memory system for efficient data processing and an operating method thereof.

2. Related Art

Data are becoming important assets in the fourth industrial revolution, and the demands for new technology in support of transmitting and analyzing large-scale data at a high data rate are increasing. For example, as artificial intelligent (AI), autonomous driving, robotic, health care, virtual reality (VR), augmented reality (AR), and smart home technologies are spreading, the demands for servers or data centers are increasing.

A legacy data center includes resources for computing, networking, and storing data in the same equipment. However, a future large-scale data center may construct resources individually and then logically reconstruct the resources. For example, in the large-scale data center, the resources may be modularized at a rack level and the modularized resources may be reconstructed and supplied according to their usage. Therefore, converged storage or memory devices, which can be used for the future large-scale data center, are demanded.

SUMMARY

In an embodiment of the present disclosure, a memory system may include: a memory group including a plurality of memory devices having two or more different types; and a controller configured to control data input and output for the memory group, wherein the controller includes a scrubbing controller configured to collect health information to which a deterioration degree for each of the plurality of memory devices is reflected and determine a scrubbing interval for each of the plurality of memory devices based on the health information, the scrubbing interval being reduced in proportion to the deterioration degree.

In an embodiment of the present disclosure, an operating method of a memory system may include collecting health information to which a deterioration degree for each of a plurality of memory devices included in the memory system is reflected; and determining a scrubbing interval for each of the plurality of memory devices based on the health information, wherein the scrubbing interval is reduced in proportion to the deterioration degree.

These and other features, aspects, and embodiments are described below in the section entitled "DETAILED DESCRIPTION".

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Figure 1:
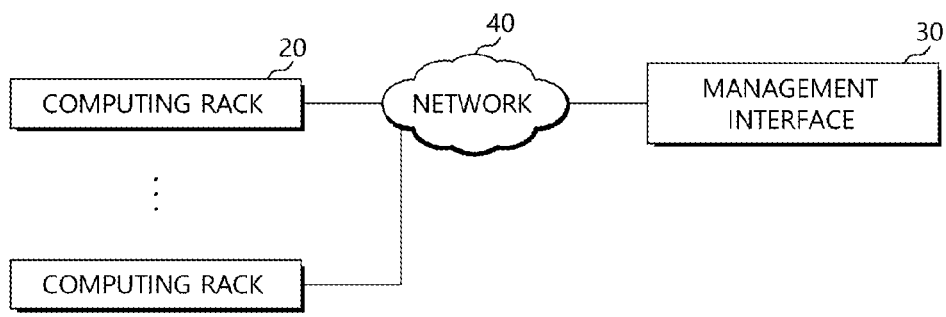
FIG. 1 illustrates a data processing system according to an embodiment of the present disclosure.

Various embodiments of the present disclosure will be described below in more detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present disclosure is described herein with reference to cross-section and/or plan illustrations of idealized embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention. Throughout the disclosure, like reference numerals refer to like parts throughout the various figures and embodiments.

FIG. 1 illustrates a data processing system 10 according to an embodiment. Referring to FIG. 1, the data processing system 10 may include a plurality of computing racks 20, a management interface 30, and a network 40 configured to enable communication between the computing racks 20 and the management interface 30. The data processing system 10 may have the rack-scale architecture, and may be used in a data center or the like for large-scale data processing.

Each of the plurality of computing racks 20 may implement one computing system in combination with other computing racks 20. Detailed configurations and operations of the computing racks 20 will be described later.

The management interface 30 may provide interactive interfacing for a user to control, operate, or manage the data processing system 10. The management interface 30 may be implemented using any type of a computing device including any of a computer, a multi-processor system, a server, a rack-mount server, a board server, a lap-top computer, a desk-top computer, a tablet computer, a wearable computing system, a network device, a web device, a distributed computing system, a processor-based system, a customer electronic device, and so on.

In some embodiments, the data processing system 10 may be implemented with a distributed system having computing functions to be performed by the computing racks 20 and user interface functions to be performed by the management interface 30. In other embodiments, the data processing system 10 may be implemented with a virtual cloud server that includes multi-computing devices distributed through the network 40. The management interface 30 may include a processor, an input/output (I/O) subsystem, a memory, a data storage device, and a communication circuit.

The network 40 may be a channel which exchanges data between the computing racks 20 and the management interface 30 and/or between the computing racks 20. The network 40 may be implemented by various wired and/or wireless networks. For example, the network 40 may include a publicly accessible global network, such as a wired/wireless local area network (LAN), a wide area network (WAN), a cellular network, and/or the Internet. In another example, the network 40 may include one or more subsidiary (or auxiliary) network devices, such as subsidiary (or auxiliary) computers, routers, and switches. In another example, the network 40 may include an interface network based on interface standards, such as cache coherent interconnect for accelerators (CCIX) and GEN-Z.

Figure 2:
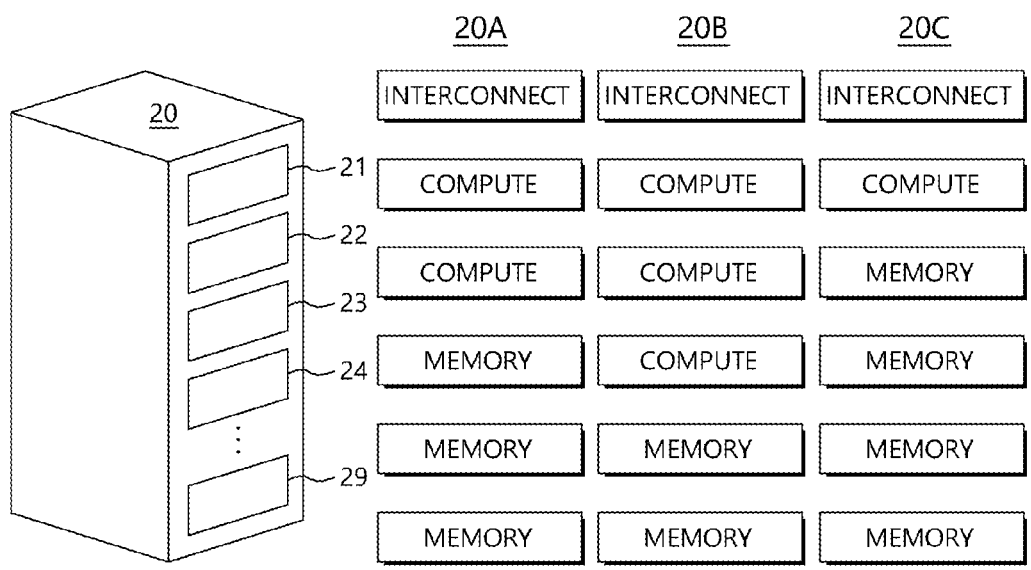
FIG. 2 illustrates architecture of a computing rack according to an embodiment of the present disclosure.

FIG. 2 illustrates architecture of a computing rack 20 according to an embodiment.

Referring to FIG. 2, the computing rack 20 may not be limited by structures, types, and names of components and the like, and the computing rack 20 may include various types of components. For example, the computing rack 20 may include a plurality of drawers 21 to 29. Each of the plurality of drawers 21 to 29 may include a plurality of boards.

In various embodiments, the computing rack 20 may be implemented by a combination of appropriate numbers of compute boards COMPUTE, memory boards MEMORY, and/or interconnect boards INTERCONNECT. Here, although it is defined that the computing rack 20 is implemented by a combination of the plurality of boards, it may be defined that the computing rack 20 is implemented by diversely named components such as drawers, modules, trays, boards, chassis, and units.

The components of the computing rack 20 may have architecture classified and distinguished according to their functions for convenience of implementation. The computing rack 20 may have architecture classified in order of an interconnect board, a compute board, and a memory board from the top, but this is not limited thereto. The computing rack 20 and a computing system implemented by the computing rack 20 may be referred to as "a rack-scale system" or "a disaggregated system." The memory board may be referred to as "a memory system".

In various embodiments, a computing system may be implemented by one computing rack 20. In other embodiments, a computing system may be implemented by all components included in two or more computing racks, some of components included in two or more computing racks, or some of components included in one computing rack 20.

In various embodiments, a computing system may be implemented by a combination of appropriate numbers of compute boards, memory boards, and interconnect boards included in the computing rack 20. As illustrated in FIG. 2, a computing rack 20A may be implemented by a combination of two compute boards COMPUTE, three memory boards MEMORY, and one interconnect board INTERCONNECT. In another example, a computing rack 20B may be implemented by a combination of three compute boards COMPUTE, two memory boards MEMORY, and one interconnect board INTERCONNECT. In still another example, a computing rack 20C may be implemented by a combination of one compute board COMPUTE, four memory boards MEMORY, and one interconnect board INTERCONNECT.

Although FIG. 2 illustrates a case where the computing rack 20 is implemented by a combination of appropriate numbers of compute boards, memory boards, and interconnect boards, the computing rack 20 may include additional components that may be included in typical servers, such as a power system, a cooling system, an I/O device, and the like.

Figure 3:
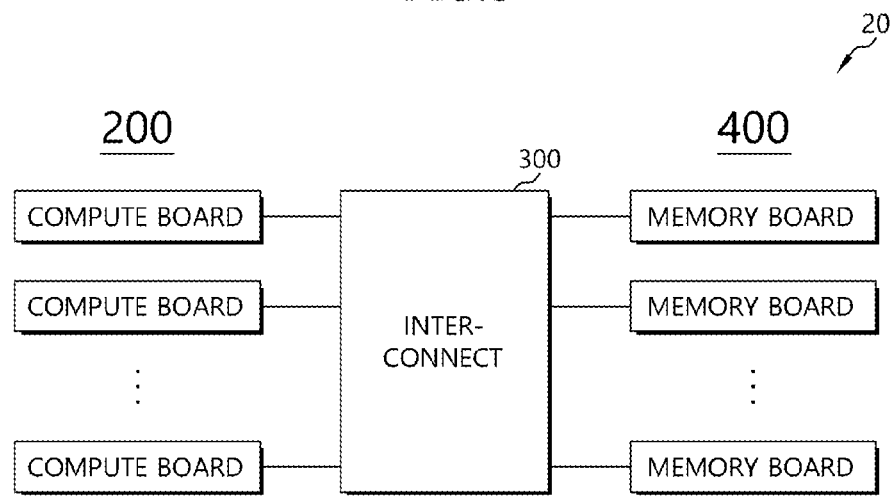
FIG. 3 illustrates a configuration of a computing rack according to an embodiment of the present disclosure.

FIG. 3 illustrates a configuration of a computing rack 20 according to an embodiment.

Referring to FIG. 3, the computing rack 20 may include a plurality of compute boards 200, a plurality of memory boards 400, and an interconnect board 300. The plurality of compute boards 200 may be referred to as pooled compute boards, pooled compute systems, or the like. Similarly, the plurality of memory boards may be referred to as pooled memory boards, pooled memory systems, or the like. Here, although it is defined that a computing rack or system is implemented by a combination of a plurality of boards, the computing rack or system may be implemented by diversely named components such as drawers, modules, trays, boards, chassis, or units.

Each of the plurality of compute boards 200 may include one or more processing elements in which hardware such as one or more of processors, processing/control circuits, and central processing units (CPUs) and software executable on the hardware are combined.

Each of the plurality of memory boards 400 may include one or more of memories such as volatile memories and nonvolatile memories. For example, each of the plurality of memory boards 400 may include dynamic random access memories (DRAMs), flash memories, memory cards, hard disc drives (HDDs), solid state drives (SSDs), or a combination thereof.

Each of the plurality of memory boards 400 may be divided, allocated, or designated by and used by one or more processing elements included in each of the compute boards 200. Each of the plurality of memory boards 400 may store one or more operating systems (OSs) to be initialized and/or executed by the compute boards 200.

The interconnect board 300 may be implemented by communication circuits, communication devices, or a combination thereof, which may be divided, allocated, and designated by and used by one or more processing elements included in each of the compute boards 200. For example, the interconnect board 300 may be implemented by an arbitrary number of network interface ports, interface cards, or interface switches. The interconnect board 300 may use protocols associated with one or more wired or wireless communication technologies for executing communication. For example, the interconnect board 300 may support communication between the compute boards 200 and the memory boards 400 according to one or more of protocols such as peripheral component interconnect express (PCIe), quick path interconnect (QPI), Ethernet, and the like. The interconnect board 300 may be coupled to the compute boards 200 by interface standards such as CCIX and GEN-Z.

Figure 4:
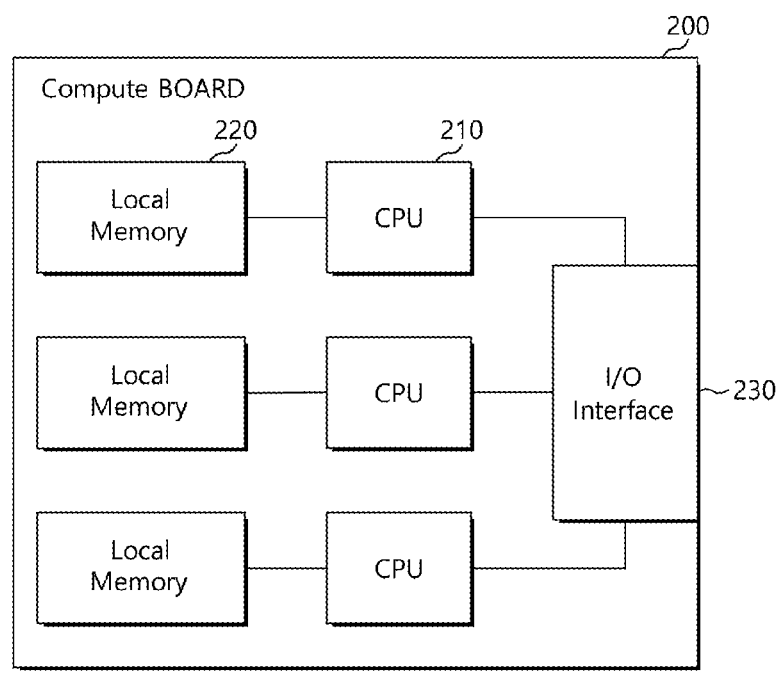
FIG. 4 illustrates a configuration of a compute board according to an embodiment of the present disclosure.

FIG. 4 illustrates a configuration of the compute board 200 shown in FIG. 3 according to an embodiment.

Referring to FIG. 4, the compute board 200 may include a plurality of CPUs 210, a plurality of local memories 220, and an I/O interface 230.

The CPUs 210 may divide, allocate, or designate one or more memory boards to be used among the plurality of memory boards 400 illustrated in FIG. 3. The CPUs 210 may initialize the one or more memory boards that are divided, allocated, or designated, and perform a data read operation, a data write (or program) operation, and the like on the one or more memory boards.

The local memories 220 may store data required to perform operations of the CPUs 210. In various embodiments, the local memories 220 may be in a one-to-one correspondence with the CPUs 210.

The I/O interface 230 may support interfacing between the CPUs 210 and the memory boards 400 through the interconnect boards 300 of FIG. 3. The I/O interface 230 may output data from the CPUs 210 to the interconnect board 300 and input data from the interconnect board 300 to the CPUs 210, using protocols associated with one or more wired or wireless communication technologies. For example, the I/O interface 230 may support communication between the CPUs 210 and the interconnect board 300 according to one or more of protocols such as PCIe, QPI, Ethernet, and the like. The I/O interface 230 may support communication between the CPUs 210 and the interconnect board 300 according to interface standards such as CCIX and GEN-Z.

Figure 5:
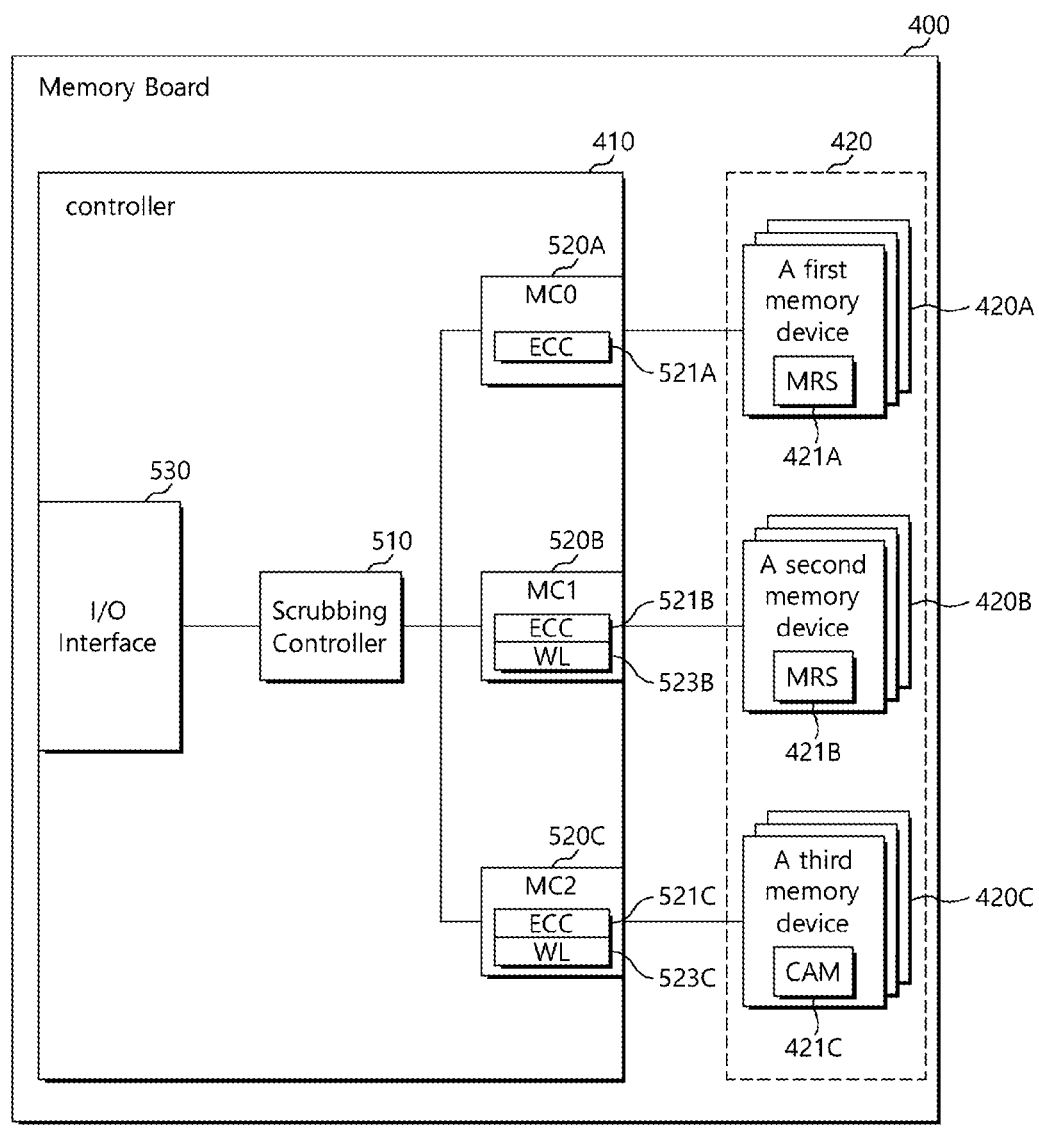
FIG. 5 illustrates a configuration of a memory board according to an embodiment of the present disclosure.

FIG. 5 illustrates a configuration of the memory board 400 shown in FIG. 3 according to an embodiment.

Referring to FIG. 5, the memory board 400 may include a controller 410 and a memory device group 420. The memory device group 420 may include two or more memory groups, e.g., first to third memory groups. The first to third memory groups may store (or write) data and output (or read) stored data, according to control of the controller 410. The first to third memory groups may perform a scrubbing operation according to control of the controller 410. The scrubbing operation may be performed to maintain and manage data stored in the first to third memory groups by periodically checking whether data stored in the first to third memory groups are normal or abnormal and correcting errors of the data, to thereby ensure reliability of the data stored in the first to third memory groups. Each of the first, second, and third memory groups may include a multiplicity of memories. The first memory group includes a multiplicity of first memory devices 420A. The second memory group includes a multiplicity of second memory devices 420B. The third memory group includes a multiplicity of third memory devices 420C.

The first memory device 420A, the second memory device 420B, and the third memory device 420C may have the same characteristic or different characteristics. In various embodiments, the first memory device 420A, the second memory device 420B, and the third memory device 420C may have different characteristics in terms of storage capacity or latency. The first and second memory devices 420A and 420B may respectively include registers 421A and 421B each storing a mode register set (MRS) as an operation parameter, and the third memory device 420C may include a content addressable memory (CAM) 421C. The first memory device 420A may be a DRAM. The second memory device 420B may be a phase-change random access memory (PCRAM). The third memory device 420C may be a flash memory. However, the first, second, and third memory devices 420A, 420B, and 420c are not limited thereto. The operation parameter may include bias set information, a timing parameter, an operation mode, an operation option, and the like related to an operation of a memory device, e.g., the first, second and third memory devices 420A, 420B and 420C, but this is not limited thereto.

In an embodiment, the number of weak cells and locations of the weak cells in the memory devices 420A, 420B, and 420C may be stored in the registers 421A and 421B and the CAM 421C. This will be described later.

The controller 410 may include a scrubbing controller 510, memory controllers (MC0, MC1, and MC2) 520A, 520B, and 520C, and an I/O interface 530.

The memory controllers 520A, 520B, and 520C may correspond to the first, second, and third memory devices 420A, 420B, and 420C, respectively. The memory controllers 520A, 520B, and 520C may include error check and correction (ECC) circuit units 521A, 521B, and 521C, respectively. The ECC circuit units 521A, 521B, and 521C may detect and correct error bits and count the number of error bits in data read from the memory devices 420A, 420B, and 420C, respectively.

The memory controllers 520B and 520C configured to control the nonvolatile memory devices 420B and 420C among the memory controllers 520A, 520B, and 520C may further include wear-level management units (WL) 523B and 523C, respectively.

Each of the wear-level management unit 523B and 523C may store the number of program/erase (P/E) cycles permitted to each of the nonvolatile memory devices 420B and 420C and the cumulative number of P/E cycles, or store the number of writing permitted to each of the memory devices 420B and 420C and the cumulative number of writing. The wear-level management unit 523B and 523C may control leveling of a wear level for memory regions (banks, blocks, or the like) constituting the nonvolatile memory devices 420B and 420C. The cumulative number of P/E cycles or the cumulative number of writing may be increased by repeatedly performing a P/E operation or a write operation on each of the nonvolatile memory devices 420B and 420C as a period of using each of the nonvolatile memory devices 420B and 420C is increased.

The scrubbing controller 510 may receive health information of the memory devices 420A, 420B, and 420C from the memory controllers 520A, 520B, and 520C respectively corresponding to the memory devices 420A, 420B, and 420C. The health information may use different factors according to types of the memory devices 420A, 420B, and 420C. In an embodiment, health information for a nonvolatile memory device, such as a PCRAM or a flash memory, among the memory devices 420A, 420B, and 420C may include at least one of wear-level information, weak cell information, and error check and correction (ECC) information, and health information for a volatile memory device among the memory devices 420A, 420B, and 420C may include at least one of the weak cell information and the ECC information. Accordingly, the memory controller 520A, 520B, and 520C may collect the health information for the memory devices 420A, 420B, and 420C. The scrubbing controller 510 may determine scrubbing intervals for the memory devices 420A, 420B, and 420C based on the health information received from the memory controllers 520A, 520B, and 520C. A scrubbing interval may represent a time period for performing a scrubbing operation on a memory device.

The wear-level information may be a factor indicating whether the memory devices 420A, 420B, and 420C can normally program data. For example, the wear-level information may include the number of P/E cycles permitted to the nonvolatile memory devices 420B and 420C and the cumulative number of P/E cycles, or include the number of writing permitted to the memory devices 420A, 420B, and 420C and the cumulative number of writing.

The weak cell information may be information for the number of weak cells included in each of the memory devices 420A, 420B, and 420C or information for memory regions including the weak cells. A weak cell may be a memory cell which has a high failure probability due to its data retention time that is shorter than a data retention time of a normal cell. A weak cell in a volatile memory device may be a memory cell having a data retention time that is shorter than a reference time. A weak cell in a nonvolatile memory device may be a memory cell of which a threshold voltage is out of a reference range.

The ECC information may be information for a memory region having the cumulative number of error bits or an error occurrence frequency that larger than a preset threshold value, the cumulative number of error bits or an error occurrence frequency being detected from data output from each of the memory devices 420A, 420B, and 420C, is larger than a preset threshold value.

In an embodiment, the scrubbing controller 510 may receive the health information from the memory controllers 520A, 520B, and 520C and store and update the health information when the memory board 400 is first booted, whenever the memory board 400 is booted again, and every preset interval while the memory board 400 operates. The scrubbing controller 510 may determine the scrubbing intervals for the memory devices 420A, 420B, and 420C based on the stored health information, for example, one or more of factors of the health information. The scrubbing controller 510 may perform the scrubbing operation on the memory devices 420A, 420B, and 420C at the determined scrubbing intervals.

The scrubbing controller 510 may determine the scrubbing intervals again based on the updated health information.

The I/O interface 530 may support interfacing between the memory board 400 and the compute boards 200 through the interconnect board 300 of FIG. 3. The I/O interface 530 may output transmission data from the memory board 400 to the interconnect board 300 and input reception data from the interconnect board 300 to the memory board 400, using protocols associated with one or more wired or wireless communication technologies. For example, the I/O interface 530 may support communication between the scrubbing controller 510 and the interconnect board 300 according to one or more of protocols such as PCIe, QPI, Ethernet, and the like. The I/O interface 530 may support the communication between the scrubbing controller 510 and the interconnect board 300 according to interface standards such as CCIX and GEN-Z.

As described above, server systems or data processing systems such as data centers may have architecture that a plurality of boards such as compute boards and storage or memory boards are classified and mounted on a unit rack. For example, a plurality of memories having different characteristics from each other may be included in one memory board to satisfy various user workloads. In this example, one memory board may be a convergence memory board in which a plurality of memories such as a DRAM, a PCRAM, a magnetic RAM (MRAM), a spin torque transfer magnetic RAM (STT-RAM), and a flash memory are converged. The convergence memory board may be used in various usage models since the memories in the convergence memory board have the different characteristics from each other.

Figure 6:
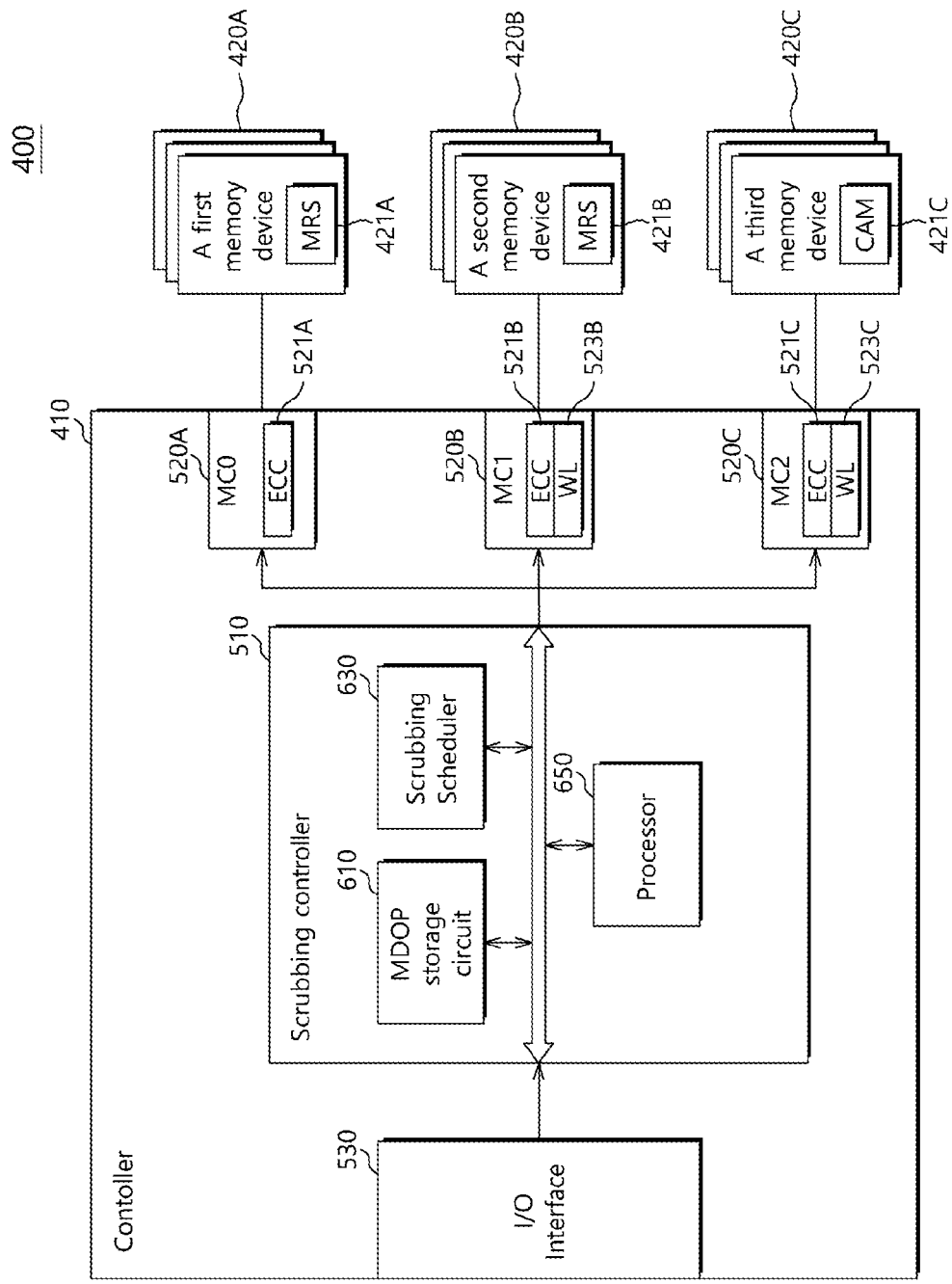
FIG. 6 illustrates a detailed configuration of the memory board of FIG. 5 according to an embodiment of the present disclosure.

FIG. 6 illustrates a configuration of the memory board 400 of FIG. 5 according to an embodiment. In particular, FIG. 6 illustrates a detailed structure of the scrubbing controller 510 of FIG. 5.

As described above with reference to FIG. 5, the memory board 400 may include the controller 410 and the plurality of memory devices 420A, 420B, and 420C.

The plurality of memory devices 420A, 420B, and 420C may be different types of memory devices. In various embodiments, each of the plurality of memory devices 420A, 420B, and 420C may be selected from volatile and nonvolatile memory devices including a DRAM, a managed DRAM solution (MDS), a PCRAM, a NAND flash memory, and so on.

For example, the plurality of memory devices 420A, 420B, and 420C may be memory devices having a higher data processing rate in order of a first memory device 420A, a second memory device 420B, and a third memory device 420C. In another example, the plurality of memory devices 420A, 420B, and 420C may be memory devices having a larger memory capacity in order of the third memory device 420C, the second memory device 420B, and the first memory device 420A. The first memory device 420A may be a volatile memory device and the second and third memory devices 420B and 420C may be nonvolatile memory devices.

The controller 410 may include the scrubbing controller 510, the I/O interface 530, and the memory controllers 520A, 520B, and 520C. Since the I/O interface 530 and the memory controllers 520A, 520B, and 520C are described above with reference to FIG. 5, detailed description therefor will be omitted.

The scrubbing controller 510 may include a memory device operation parameter (MDOP) storage circuit 610, a scrubbing scheduler 630, and a processor 650.

The MDOP storage circuit 610 may store initial values of scrubbing intervals for the memory devices 420A, 420B, and 420C, and store health information, for example, at least one of wear-level information, weak cell information, and ECC information for the memory devices 420A, 420B, and 420C, read from the memory controllers 520A, 520B, and 520C. For example, the MDOP storage circuit 610 may receive and update the health information for the memory devices 420A, 420B, and 420C when the memory board 400 is first booted, whenever the memory board 400 is booted again, and every preset interval while the memory board 400 operates.

The scrubbing scheduler 630 may receive the initial values of the scrubbing intervals and the health information from the MDOP storage circuit 610, and determine the scrubbing intervals for the memory devices 420A, 420B, and 420C based on the whole health information or some of the health information. The scrubbing scheduler 630 may transmit the determined scrubbing intervals to the memory controllers 520A, 520B, and 520C, and the memory controllers 520A, 520B, and 520C may respectively control scrubbing operations of the memory devices 420A, 420B, and 420C according to the received scrubbing intervals. The scrubbing scheduler 630 may periodically receive the health information and determine the scrubbing intervals based on the health information, and thus the scrubbing scheduler 630 may maintain or change the scrubbing intervals for the memory devices 420A, 420B, and 420C based on the health information.

In an embodiment, the scrubbing scheduler 630 may determine the scrubbing intervals based on the wear-level information. The wear-level information may include the number of P/E cycles permitted to the memory devices 420A, 420B, and 420C and the cumulative number of P/E cycles, or the number of writing permitted to the memory devices 420A, 420B, and 420C and the cumulative number of writing. As the cumulative number of P/E cycles or the cumulative number of writing is increased or as the cumulative number of P/E cycles or the cumulative number of writing approaches the permitted number of P/E cycles or the permitted number of writing, the scrubbing scheduler 630 may reduce the scrubbing intervals for the memory devices 420A, 420B, and 420C. In an embodiment, as the cumulative number of P/E cycles or the cumulative number of writing is increased and thus enters into a predetermined range before the cumulative number of P/E cycles or the cumulative number of writing reaches the permitted number of P/E cycles or the permitted number of writing, the scrubbing scheduler 630 may gradually reduce the scrubbing intervals for the memory devices 420A, 420B, and 420C.

In an embodiment, the scrubbing scheduler 630 may reduce the scrubbing intervals as the cumulative number of error bits is increased. The scrubbing scheduler 630 may collect, as the health information, the error occurrence frequency for memory regions (for example, banks, blocks, or the like) constituting each of the memory devices 420A, 420B, and 420C, and reduce scrubbing intervals for memory regions having the error occurrence frequency that is higher than a preset threshold value.

In an embodiment, the scrubbing scheduler 630 may receive information for the number of weak cells and information for memory regions including the weak cells as the health information. As the number of weak cells is increased, the scrubbing scheduler 630 may reduce the scrubbing intervals for the memory devices 420A, 420B, and 420C or reduce scrubbing intervals for the memory regions (banks, blocks, or the like) including the weak cells.

The scrubbing scheduler 630 may determine the scrubbing intervals for the memory devices 420A, 420B, and 420C by combining all or portions of the wear-level information, the weak cell information, and the ECC information of the health information.

In an embodiment, the scrubbing scheduler 630 may determine the scrubbing intervals by considering the wear-level information and the ECC information or by considering the wear-level information and the weak cell information. For example, when the number of error bits or the number of weak cells is smaller than a preset threshold value in a state that the cumulative number of P/E cycles or the cumulative number of writing is increased, the scrubbing scheduler 630 may determine that a corresponding memory device 420A, 420B, or 420C is less deteriorated.

Accordingly, in a state that a memory device is wear-levelled at a certain level or more, the scrubbing scheduler 630 may reduce a scrubbing interval when the number of error bits or the number of weak cells in the memory device is relatively large, e.g., larger than the preset threshold value and may not reduce the scrubbing interval when the number of error bits or the number of weak cells is relatively small, e.g., smaller than the preset threshold value. Accordingly, the power consumption of the memory device may be reduced.

The processor 650 may control an overall operation of the scrubbing controller 510. The processor 650 may be configured in a combination of hardware and software executable on the hardware.

As described above, in the embodiments of the present disclosure, the scrubbing intervals may be changed according to the health information of the memory devices 420A, 420B, and 420C. For example, in early usage stages of products in which the memory devices 420A, 420B, and 420C have excellent health levels, power consumption required for performing scrubbing operations may be minimized by increasing the scrubbing intervals. After that, a period of using the memory devices 420A, 420B, and 420C is increased, the scrubbing intervals therefor may be reduced so that errors occurring due to aging of memory cells in the memory devices 420A, 420B, and 420C are timely detected and corrected.

Figure 7:
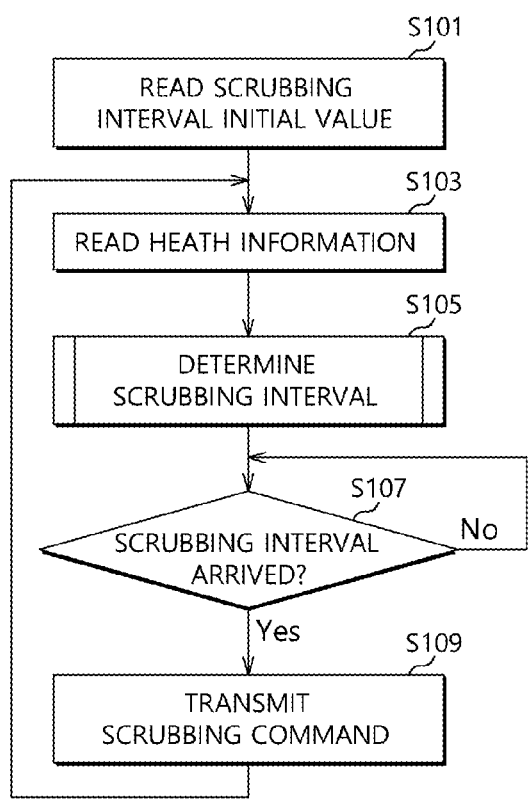
FIG. 7 is a flowchart illustrating an operating method of a memory system according to an embodiment of the present disclosure.

FIG. 7 is a flowchart explaining an operating method of a memory system according to an embodiment. The operating method of FIG. 7 will be described with reference to FIG. 6.

When the memory board 400 is first booted or whenever the memory board 400 is booted again, the controller 410 may collect and update the health information of the plurality of memory devices 420A, 420B, and 420C. The health information may be stored in the MDOP storage circuit 610 of the scrubbing controller 510 of the memory board 400.

The MDOP storage circuit 610 may store the initial values of the scrubbing intervals and the health information of the plurality of memory devices 420A, 420B, and 420C.

The scrubbing controller 510 may read the initial values of the scrubbing intervals for the memory devices 420A, 420B, and 420C from the MDOP storage circuit 610 at S101, and read the health information of the memory devices 420A, 420B, and 420C from the MDOP storage circuit 610 at S103.

The scrubbing scheduler 630 may determine the scrubbing intervals based on the health information at S105.

The process S105 of determining the scrubbing intervals will be described in detail below.

In an embodiment, the scrubbing scheduler 630 may determine a type of the health information that is to be used to determine the scrubbing intervals.

When the health information is the wear-level information, the wear-level information may include the number of program/erase (P/E) cycles permitted to the memory devices 420A, 420B and 420C and the cumulative number of P/E cycles or the number of writing permitted to the memory devices 420A, 420B, and 420C and the cumulative number of writing. As the cumulative number of P/E cycles or the cumulative number of writing is increased or as the cumulative number of P/E cycles or the cumulative number of writing approaches the permitted number of P/E cycles or the permitted number of writing, the scrubbing scheduler 630 may reduce the scrubbing intervals for the memory devices 420A, 420B, and 420C.

When the health information is the ECC information, the ECC information may include the cumulative number of error bits. The scrubbing scheduler 630 may reduce a scrubbing interval depending on the increase of the cumulative number of error bits. The ECC information may include an error occurrence frequency for each of the memory regions (for example, banks, blocks, or the like). The scrubbing scheduler 630 may change a scrubbing interval for each of the memory regions constituting the memory devices 420A, 420B, and 420C. For example, the scrubbing scheduler 630 may reduce a scrubbing interval for a memory region having an error occurrence frequency that is higher than a preset threshold value.

When the health information is the weak cell information, the weak cell information may include the number of weak cells and information for memory regions including the weak cells. The scrubbing scheduler 630 may reduce the scrubbing intervals for the memory devices 420A, 420B, and 420C or reduce scrubbing intervals of the memory regions including the weak cells, according to the increase degree of the number of weak cells.

The health information may include two or more of the wear-level information, the ECC information, and the weak cell information.

In an embodiment, the health information may include the wear-level information and the ECC information or include the wear-level information and the weak cell information. When the number of error bits or the number of weak cells is smaller than a second threshold value in a state that the cumulative number of P/E cycles or the cumulative number of writing is increased to be larger than a first threshold value, the scrubbing scheduler 630 may determine that a corresponding memory device in the memory device group 420 is less deteriorated. Accordingly, in a state that a memory device is wear-levelled at a certain level or more corresponding to the first threshold value, the scrubbing scheduler 630 may reduce the scrubbing intervals when the number of error bits or the number of weak cells is relatively large, for example, when the number of error bits or the number of weak cells is equal to or larger than the second threshold value. However, the scrubbing scheduler 630 may not reduce the scrubbing intervals when the number of error bits or the number of weak cells is relatively small, for example, when the number of error bits or the number of weak cells is smaller than the second threshold value. Accordingly, the power consumption of the memory devices 420A, 420B, and 420C may be reduced.

The scrubbing intervals determined by the scrubbing scheduler 630 may be provided to the memory controllers 520A, 520B, and 520C.

The memory controllers 520A, 520B, and 520C may determine whether or not the scrubbing intervals have arrived at S107. When it is determined that the scrubbing intervals have arrived at S107, the memory controllers 520A, 520B, and 520C may transmit a scrubbing command to the memory devices 420A, 420B, and 420C at S109 to perform a scrubbing operation on the memory devices 420A, 420B, and 420C. Then, the controller 410 may proceed to the process S103 and determine the scrubbing intervals again by reflecting health information updated according to the use of the memory devices 420A, 420B, and 420C.

On the other hand, when it is determined that the scrubbing intervals have not arrived at S107, the memory controllers 520A, 520B, and 520C may wait until the scrubbing intervals arrive. When the scrubbing intervals have arrived after the waiting, the memory controllers 520A, 520B, and 520C may transmit the scrubbing command to the memory devices 420A, 420B, and 420C at S109.

A memory system according to an embodiment may determine the scrubbing intervals for the memory devices 420A, 420B, and 420C based on the health information to which deterioration degrees of the memory devices 420A, 420B, and 420C are reflected. For example, because a memory device is more deteriorated as the cumulative number of programming or writing of the memory device is increased, a scrubbing interval for the memory device may be reduced as the number of usages or a period of using the memory device is increased.

Since a memory device is more deteriorated as the number of weak cells or the number of error bits is increased, a scrubbing interval for a memory region where weak cells are disposed or the error bits occur may be reduced.

Accordingly, in an early usage stage of a memory device, the power consumption required for performing a scrubbing operation may be reduced by increasing a scrubbing interval. The scrubbing interval may be controlled according to a deterioration level of the memory device, and thus errors occurring due to aging of memory cells in the memory device may be timely detected and corrected.

The above described embodiments of the present disclosure are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. An operating method of a memory system, the method comprising:
 collecting health information to which a deterioration degree for each of a plurality of memory devices included in the memory system is reflected; and
 determining a scrubbing interval for each of the plurality of memory devices based on the health information,
 wherein the health information includes wear-level information and one or both of weak cell information and error check and correction (ECC) information, and
 wherein the scrubbing interval is reduced when a cumulative number of weak cells or a cumulative number of error bits is equal to or larger than a second threshold value in a state that the wear-level information is equal to or larger than a first threshold value, the weak cell information including the cumulative number of weak cells, the ECC information including the cumulative number of error bits.

2. The method of claim 1, wherein the wear-level information includes a number of program/erase (P/E) cycles permitted to each of the plurality of memory devices and a cumulative number of P/E cycles or includes a number of writing permitted to each of the plurality of memory devices and a cumulative number of writing.

3. The method of claim 2, wherein the weak cell information further includes information on a memory region including the weak cells, and
 the determining of the scrubbing interval includes reducing a scrubbing interval for the memory region when the cumulative number of weak cells is equal to or larger than the second threshold value in a state that the cumulative number of P/E cycles or the cumulative number of writing is equal to or larger than the first threshold value.

4. The method of claim 2, wherein the ECC information further includes information on a memory region where the error bits occur, and
 the determining of the scrubbing interval includes reducing a scrubbing interval for the memory region when the cumulative number of weak cells is equal to or larger than the second threshold value in a state that the cumulative number of P/E cycles or the cumulative number of writing is equal to or larger than the first threshold value.

5. A memory system, comprising:
 a memory group including a plurality of memory devices having two or more different types;
 a controller configured to control data input and output for the memory group;
 a memory device operation parameter (MDOP) storage circuit configured to collect and store health information to which a deterioration degree for each of the plurality of memory devices is reflected; and a scrubbing scheduler configured to determine a scrubbing interval for each of the plurality of memory devices based on the health information, the scrubbing interval being reduced in proportion to the deterioration degree, wherein the health information includes wear-level information and one or both of weak cell information and error check and correction (ECC) information, and wherein the scrubbing scheduler reduces the scrubbing interval when a cumulative number of weak cells or a cumulative number of error bits is equal to or larger than a second threshold value in a state that the wear-level information is equal to or larger than a first threshold value, the weak cell information including the cumulative number of weak cells, the ECC information including the cumulative number of error bits.

6. The memory system of claim 5, wherein, the wear-level information includes a number of program/erase (P/E) cycles permitted to each of the plurality of memory devices and a cumulative number of P/E cycles or includes a number of writing permitted to each of the plurality of memory devices and a cumulative number of writing.

7. The memory system of claim 6, wherein, the weak cell information further includes information on a memory region including the weak cells, and the scrubbing scheduler reduces the scrubbing interval when the cumulative number of weak cells is equal to or larger than the second threshold value in a state that the cumulative number of P/E cycles or the cumulative number of writing is equal to or larger than the first threshold value.

8. The memory system of claim 6, wherein the ECC information further includes information on a memory region where the error bits occur, and the scrubbing scheduler reduces the scrubbing interval when the cumulative number of error bits is equal to or larger than the second threshold value in a state that the cumulative number of P/E cycles or the cumulative number of writing is equal to or larger than the first threshold value.

* * * * *